(12) United States Patent
Sun et al.

(10) Patent No.: US 6,755,929 B2
(45) Date of Patent: Jun. 29, 2004

(54) METHOD FOR ADHERING A TITANIUM LAYER ON MATERIAL

(76) Inventors: Huei-Hsin Sun, No. 5-1, Alley22, Lane 160, Tahu Street, Neihu Dist. Taipei City (TW); Ching-Ping Chen, 5F, No. 57, Sec. 3 Min-Sheng East Road, Taipei City (TW)

( * ) Notice: Subject to any disclaimer, the term of this patent is extended or adjusted under 35 U.S.C. 154(b) by 315 days.

(21) Appl. No.: 09/951,365

(22) Filed: Sep. 13, 2001

(65) Prior Publication Data

US 2003/0047270 A1 Mar. 13, 2003

(51) Int. Cl.$^7$ .............................................. B32B 31/00
(52) U.S. Cl. .................... 156/212; 156/213; 156/308.2; 156/309.6; 156/309.9; 156/322
(58) Field of Search .......................... 156/308.2, 309.6, 156/309.9, 322, 320, 212, 213, 475

(56) References Cited

U.S. PATENT DOCUMENTS 4,894,102 A * 1/1990 Halls et al. .................... 156/94

FOREIGN PATENT DOCUMENTS

| WO | WO-94/05483 A1 | * | 3/1994 |
| WO | WO-95/03176 A1 | * | 2/1995 |
| WO | WO-96/39294 A1 | * | 12/1996 |

* cited by examiner

Primary Examiner—Jeff H. Aftergut
(74) Attorney, Agent, or Firm—Alan D. Kamrath; Nikolai & Mersereau, P.A.

(57) ABSTRACT

A laminate forming process includes installing a heater assembly in a processing chamber, the heater assembly having a lower diffusion screen; coupling a vacuum assembly to channels of a platform; conveying layers of titanium and solid adhesive at room temperature onto a workpiece on the platform heating the processing chamber to a predetermined temperature by the heater assembly through the diffusion screen for evenly applying heat to the layers of titanium and adhesive and the workpiece and melting the layer of adhesive; and activating the vacuum assembly for sucking the layers of titanium and adhesive onto the workpiece through a communication of the channels so as to secure the layers of titanium and adhesive onto the workpiece and smooth the layer of titanium.

4 Claims, 4 Drawing Sheets

METHOD FOR ADHERING A TITANIUM LAYER ON MATERIAL

FIELD OF THE INVENTION

The present invention relates to laminates, and more particularly to a method for forming a titanium layer on a ferrous or nonferrous workpiece by adhering a polyolefin, polyamide, or polyurethane layer therebetween so as to enhance a bonding strength of titanium on the workpiece and smooth the surface thereof.

BACKGROUND OF THE INVENTION

It is well known to laminate a titanium layer on a ferrous or nonferrous workpiece. A typical process referring to FIG. 1 comprises the steps of coating an adhesive 92 on the underside of a layer of titanium 93 at room temperature, and adhering the layer of titanium 93 onto a workpiece 91. However, the prior art suffered from a couple of disadvantages. For example, the coating of the adhesive 92 on the underside of the layer of titanium 93 is not uniform. Further, the process is time-consuming. Furthermore, a plurality of bubbles exist within the adhesive 92 because the manufacturing process is performed in a non-vacuum environment at room temperature. As a result, the layer of titanium 93 tends to peel off the workpiece 91 after a predetermined period time of use. Moreover, the formed workpiece 91 does not have a smooth surface. Thus, the need for improvement exists.

SUMMARY OF THE INVENTION

It is therefore an object of the present invention to provide a laminate forming process comprising the steps of (a) installing a heater assembly in a processing chamber, the heater assembly having a diffusion screen secured below; (b) coupling a vacuum assembly to a plurality of channels of a platform; (c) continuously conveying layers of titanium and solid adhesive at room temperature onto a workpiece on the platform for heating the processing chamber to a predetermined temperature by the heater assembly through the diffusion screen so as to evenly apply heat to the layers of titanium and adhesive and the workplace and melting the layer of adhesive; and (e) activating the vacuum assembly for sucking the layers of titanium and adhesive onto the workpiece through a communication of the channels so as to secure the layers of titanium and adhesive onto the workpiece and smooth the layer of titanium.

DETAILED DESCRIPTION OF TUE PREFERRED EMBODIMENTS

Figure 1:
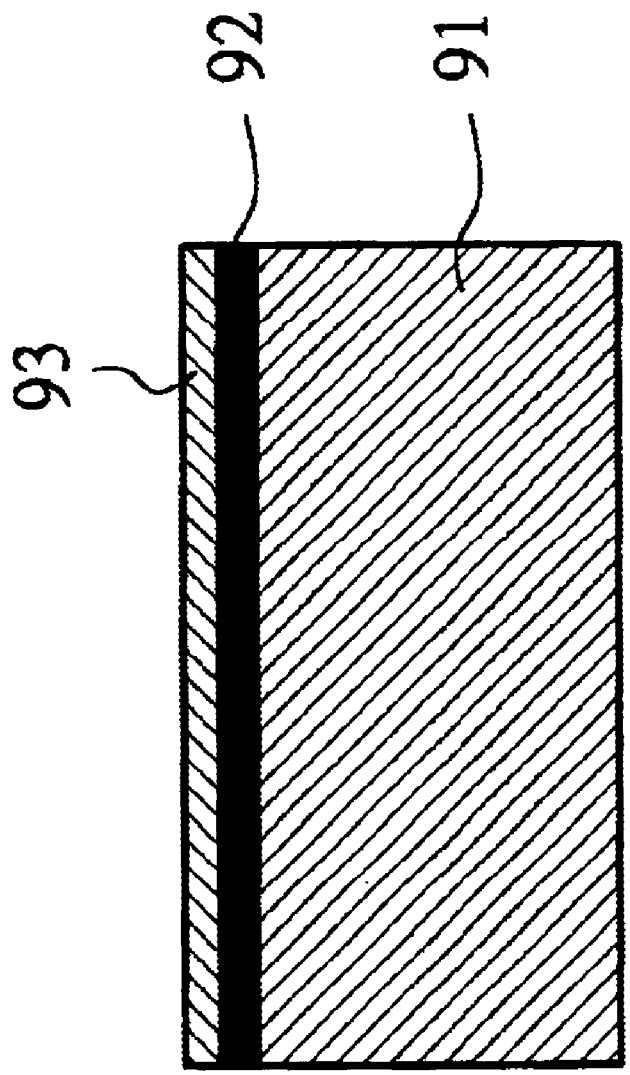
FIG. 1 is a cross-sectional view of a layer of titanium adhered onto a workpiece formed by a conventional process.
Figure 2:
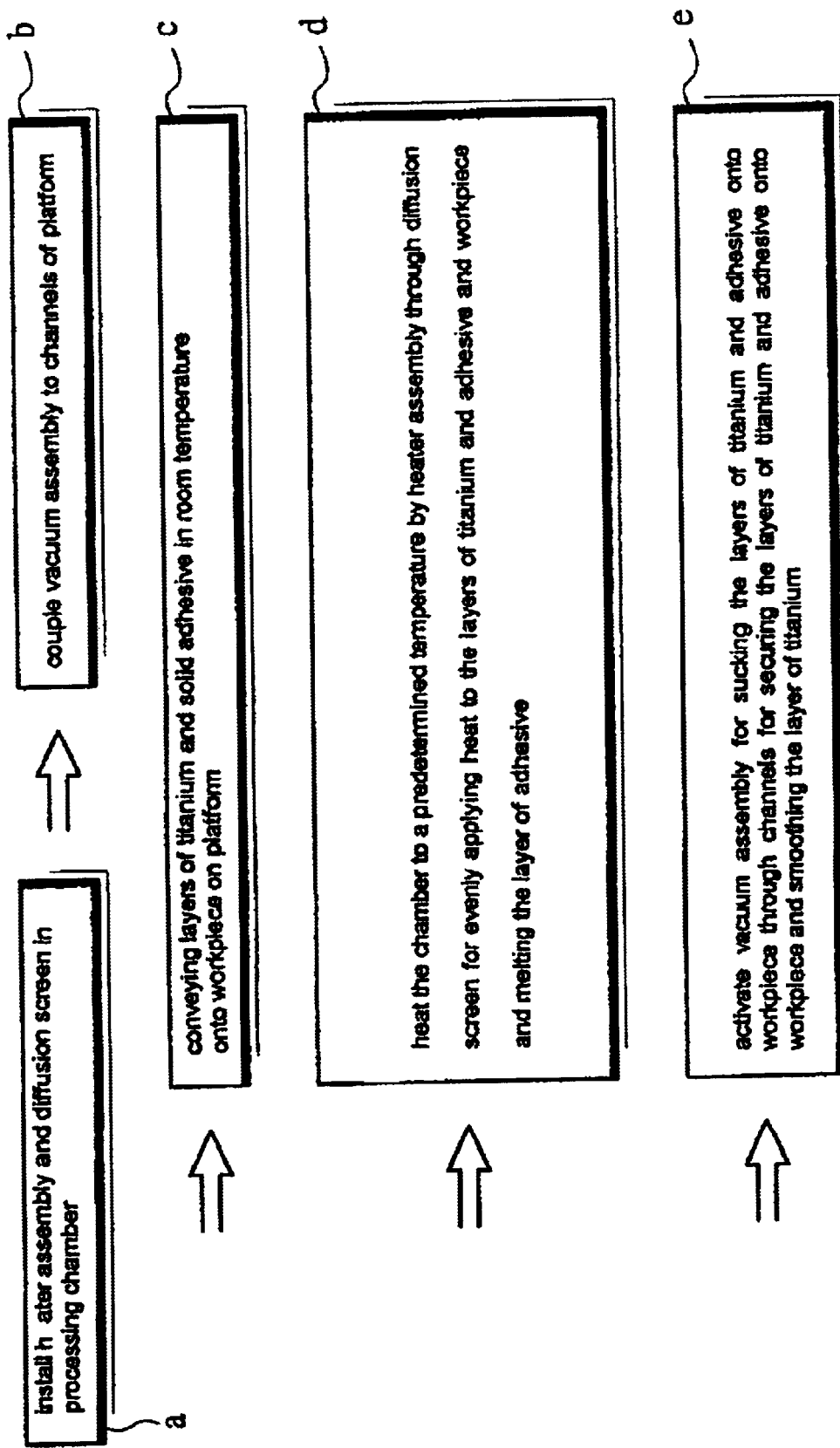
FIG. 2 is a flow chart illustrating a process of adhering a layer of titanium onto a workpiece according to the invention.
Figure 3:
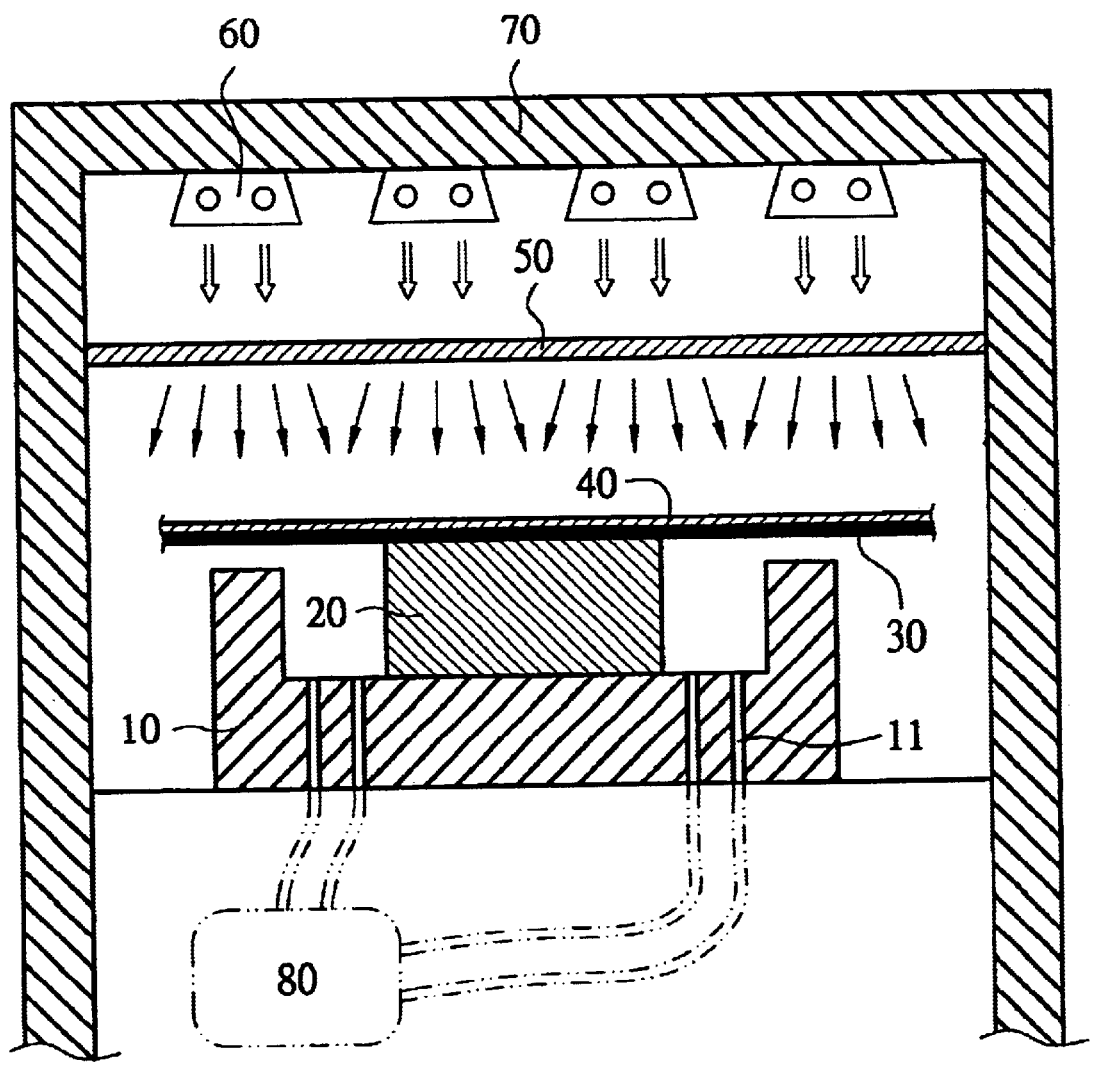
FIG. 3 is a cross-sectional view showing an apparatus according to the invention where layers of titanium and adhesive have not been adhered on a workpiece.
Figure 4:
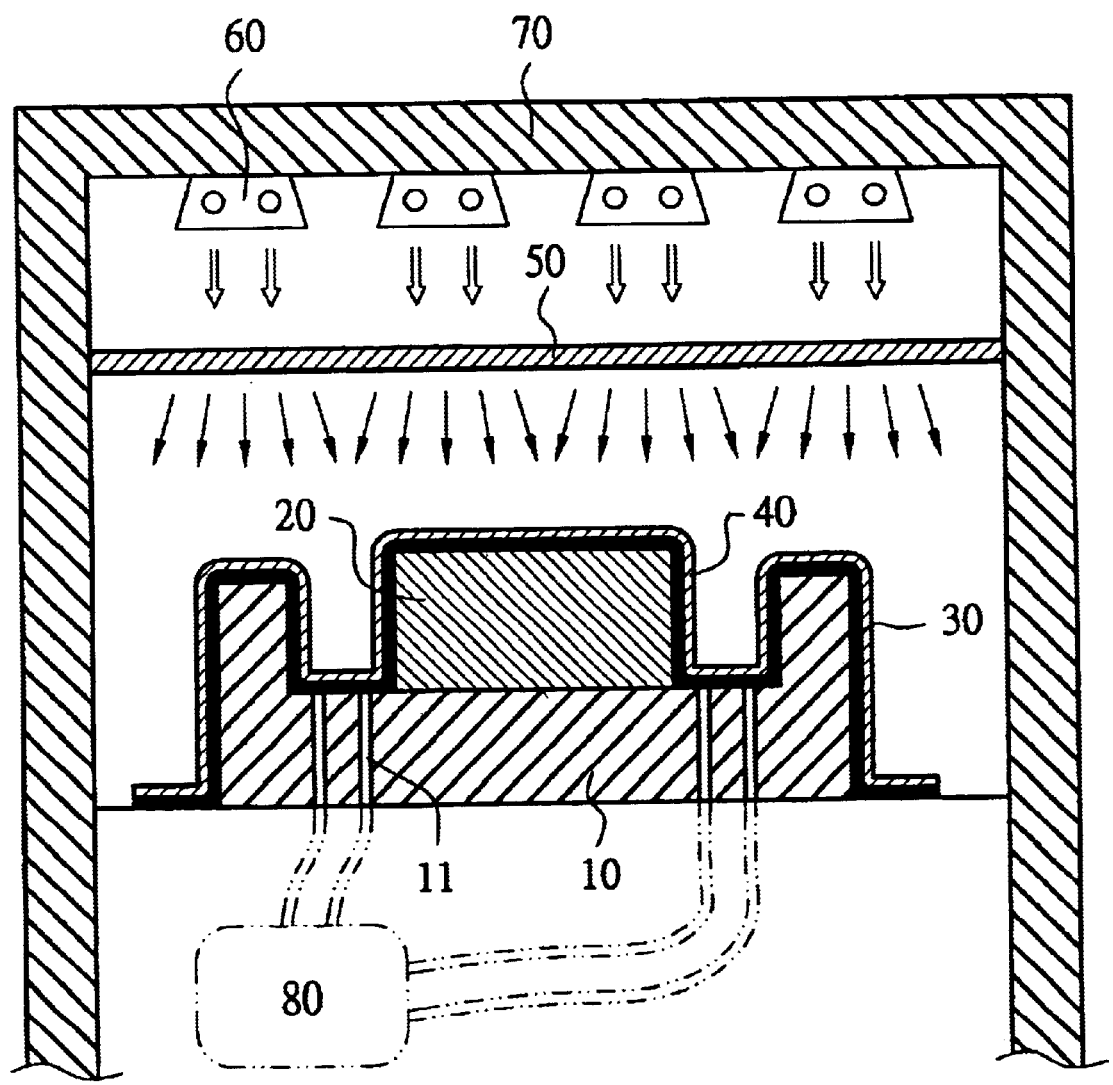
FIG. 4 is a view similar to FIG. 3 where a layer of adhesive has been melted to secure layer of titanium onto the workpiece.

Referring to FIG. 2, there is shown a process in accordance with the invention. A description of the process is made by referring to an apparatus shown in FIGS. 3 and 4. The process comprises the steps of (a) installing a heater assembly 60 in a processing chamber 70, with a diffusion screen 50 secured a distance below the heater assembly 60; (b) coupling a vacuum assembly 80 to a plurality of vertical channels 11 of a platform 10; (c) continuously conveying layers of titanium 40 and solid adhesive 30 at room temperature onto a workpiece 20 Conned of ferrous or nonferrous material on the platform 10 wherein the adhesive 30 is selected from a group of consisting of polyolefine, polyamide, and polyurethane materials depending on the ferrous or nonferrous material used to form the workpiece 20; (d) heating the processing chamber 70 to a predetermined temperature by the heater assembly 60 through the diffusion screen 50 evenly applying heat to the layers of titanium 40 and adhesive 30 and to the workpiece 20 and melting the layer of adhesive 30; and (e) activating the vacuum assembly 80 for sucking the layers of titanium 40 and adhesive 30 onto the workpiece 20 through a communication of the channels 11 so as to secure the layers of titanium 40 and adhesive 30 onto the workpiece 20 and to smooth the layer of titanium 40.

While the invention has been described by means of specific embodiments, numerous modifications and variations could be made thereto by those skilled in the art without departing from the scope and spirit of the invention set forth in the claims.

What is claimed is:

1. A laminate forming process comprising:
   (a) installing a heater assembly in a processing chamber, with a diffusion screen secured below the heater assembly;
   (b) coupling a vacuum assembly to a plurality of channels of a platform;
   (c) conveying at room temperature a layer of titanium and and a layer adhesive onto a workpiece on the platform, with the layer of adhesive being solid at room temperature;
   (d) melting the layer of adhesive conveyed onto the workpiece by hosting the processing chamber to a predetermined temperature by the heater assembly through the diffusion screen so as to evenly apply heat to the layers of titanium and adhesive conveyed onto the workpiece; and
   (e) activating the vacuum assembly after melting the layer of adhesive for sucking the layers of titanium and adhesive onto the workpiece through a communication of the channels so as to secure the layers of titanium and adhesive onto the workpiece and to smooth the layer of titanium.

2. The process of claim 1, wherein the adhesive is a polyolefine.

3. The process of claim 1, wherein the adhesive is a polyamide.

4. The process of claim 1, wherein the adhesive is a polyurethane.

* * * * *